US006811081B2

(12) United States Patent
Carlson

(10) Patent No.: US 6,811,081 B2
(45) Date of Patent: Nov. 2, 2004

(54) ARTICLE AND METHOD FOR IDENTIFICATION, CLASSIFICATION, AND INVENTORY TRACKING

(76) Inventor: David E. Carlson, 1861 Melrose Ave., St. Louis Park, MN (US) 55426

(*) Notice: Subject to any disclaimer, the term of this patent is extended or adjusted under 35 U.S.C. 154(b) by 0 days.

(21) Appl. No.: 10/075,483

(22) Filed: Feb. 12, 2002

(65) Prior Publication Data

US 2002/0074392 A1 Jun. 20, 2002

Related U.S. Application Data

(63) Continuation-in-part of application No. 09/580,853, filed on May 30, 2000.

(51) Int. Cl.[7] .................. G06F 17/60

(52) U.S. Cl. .................. 235/385; 206/418

(58) Field of Search .................. 235/385, 462.01; 206/418, 419, 420

(56) References Cited

U.S. PATENT DOCUMENTS

| | | | | |
|---|---|---|---|---|
| 3,787,993 A | | 1/1974 | Lyon | 40/306 |
| 3,826,222 A | | 7/1974 | Romick | 116/121 |
| 3,894,173 A | | 7/1975 | Andrews | 174/74 R |
| 4,184,592 A | | 1/1980 | Howard, Jr. | 206/327 |
| 4,613,042 A | * | 9/1986 | Aeschliman | 206/419 |
| 4,637,149 A | | 1/1987 | Rivkin | 40/2 R |
| 4,697,327 A | | 10/1987 | Adell | 29/527.4 |
| 4,953,701 A | * | 9/1990 | Maddock | 206/419 |
| 5,031,488 A | | 7/1991 | Zumeta | 81/180.1 |
| 5,164,575 A | * | 11/1992 | Neeley et al. | 235/472.01 |
| 5,542,535 A | | 8/1996 | Dalton | 206/419 |
| 5,553,708 A | * | 9/1996 | Lawrence et al. | 206/419 |
| 5,862,774 A | | 1/1999 | Moss | 116/200 |
| 6,027,141 A | | 2/2000 | Baumann, Jr. | 283/79 |

* cited by examiner

*Primary Examiner*—Daniel St. Cyr
(74) *Attorney, Agent, or Firm*—Nawrocki, Rooney & Sivertson, P.A.

(57) ABSTRACT

The present invention relates to an article and method for identification, classification, and inventory tracking of articles in bulk. The article has a first state and a second state. The state is the condition of the article including such states as new, used, broken, or depleted. When the article is new, it will have a perception indicating its state. The perception will be different from other perceptions of the article because of an identifiable characteristic which differentiates it from articles being in other states. The article has a second perception that is representative of a second state of the article. The second perception may be fixed upon or within the article or, in the alternative, the first perception may be such that, when the article changes state, the first perception changes into the second perception. The method of the invention comprises providing at least one article having at least a first state and a second state and providing each article with a first perception indicating the first state and a second perception indicating the second state of the article.

30 Claims, 11 Drawing Sheets

ARTICLE AND METHOD FOR IDENTIFICATION, CLASSIFICATION, AND INVENTORY TRACKING

This is a continuation-in-part of prior application Ser. No. 09/580,853 filed May 30, 2000.

BACKGROUND OF THE INVENTION

The present invention relates generally to the field of identification, classification, and inventory tracking of articles sold or stored in bulk. In particular, the present invention relates to an article and method utilized for identifying, classifying, and tracking articles that are packaged or stored in bulk, wherein the packaging is such that only one surface of the articles are viewable by the user.

Some articles are packaged in bulk and sent to the consumer in that condition, and when the consumer receives the articles, the packaging is opened in such a way that only one surface of the articles is visible. The articles can be packaged such that the articles themselves could be visible, or alternatively, they could be packaged in boxes or cartons having a surface visible. One such example is in the field of elongated flourescent light bulbs.

When bulbs are commercially sold, they are shipped in cartons. The cartons contain a number of bulbs and are typically opened on one end, thereby exposing the end surface of one end of each bulb. When the carton is opened, all of the visible end surfaces are identical and all of the end surfaces are unmarked. Typically, the carton is used to store the new bulbs and when the new bulbs are placed into service, old, used, or depleted bulbs are often placed into the carton until they can be properly disposed of. This method of using a single carton to store the new and old bulbs reduces the space needed to store the new and old bulbs, reduces the risk of breakage, and reduces the amount of handling required to place the bulbs in a second carton.

The problem for the user, is that the new and old bulbs look alike when viewed from their end surfaces. Therefore, the user must at least partially remove bulbs from the carton in order to identify whether any particular bulb is a new or old one. This process takes time and increases the risk of damaging the bulbs. For individual applications each time a bulb is changed, the process must be repeated. In commercial applications, where large numbers of bulbs are changed, when the process is repeated for each bulb over the course of a day, the time spent becomes significantly more tangible.

Furthermore, as the carton becomes filled with old, used, or depleted bulbs, the task of finding a new bulb becomes increasingly difficult because the ratio of new bulbs to old bulbs becomes smaller. Other systems have been attempted wherein two cartons are utilized, one carton for new bulbs and one carton for old, used, or depleted bulbs. However, this system needs twice as much storage space and typically requires the user to take two cartons along during the changing of the bulbs. Furthermore, when an empty carton is used to hold the old, used, and/or depleted bulbs, there is a substantially higher risk of breakage of the bulbs because the bulbs can more readily move around within the confines of the carton.

Therefore, there is a need in the art of identification, classification, and inventory management for an article and method that enables a user, of articles shipped in bulk, to identify, classify, and track an article merely from a visible surface of the article.

The present invention addresses these needs, as well as other problems associated with the identification, classification, and inventorying of articles stored or shipped in bulk.

SUMMARY OF THE INVENTION

The present invention relates to an article and method for identification, classification, and inventory tracking of articles in bulk. Each article has a first state. The state is the condition of the article and includes such states as new, used, broken, or depleted, etc. When the article is in its first state, it will have a perception that is an identifiable characteristic which differentiates it from articles being in other states. The article has a second perception that is representative of a second state of the article. The second perception may be fixed upon or within the article. Additionally, the first perception may be such that, when the article changes state or as time passes, the first perception changes into the second perception.

The method comprises providing at least one article having a first state and a second state and providing each article with a first perception indicating the first state and a second perception indicating the second state of the article.

The above mentioned benefits and other benefits of the invention will become clear from the following description by reference to the accompanying drawings.

DESCRIPTION OF THE PREFERRED EMBODIMENT

Figure 1:
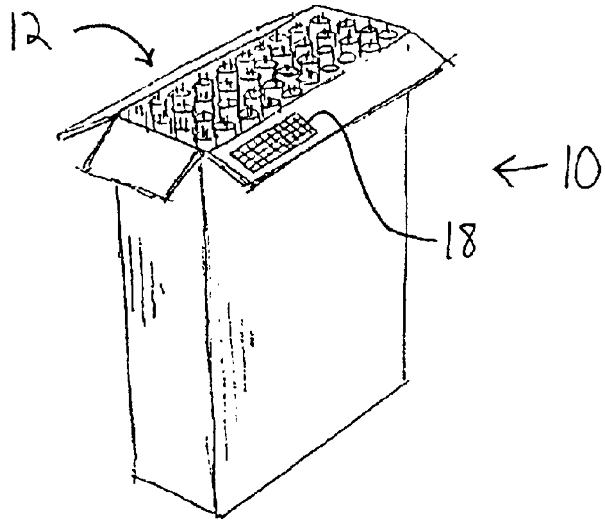
FIG. 1 is a elevated side perspective view of a carton containing bulk packaged articles upon which the present embodiment of the invention may be used.
Figure 2:
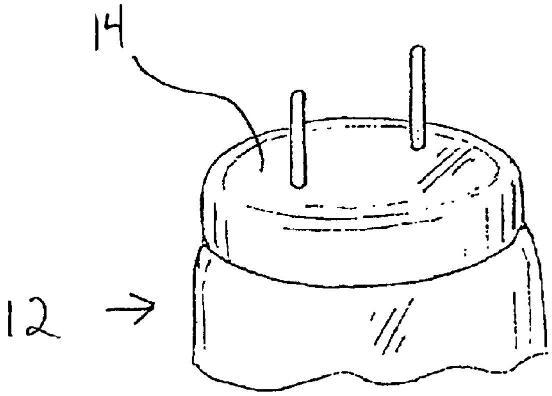
FIG. 2 is an elevated side perspective view of a typical unmarked article.
Figure 2A:
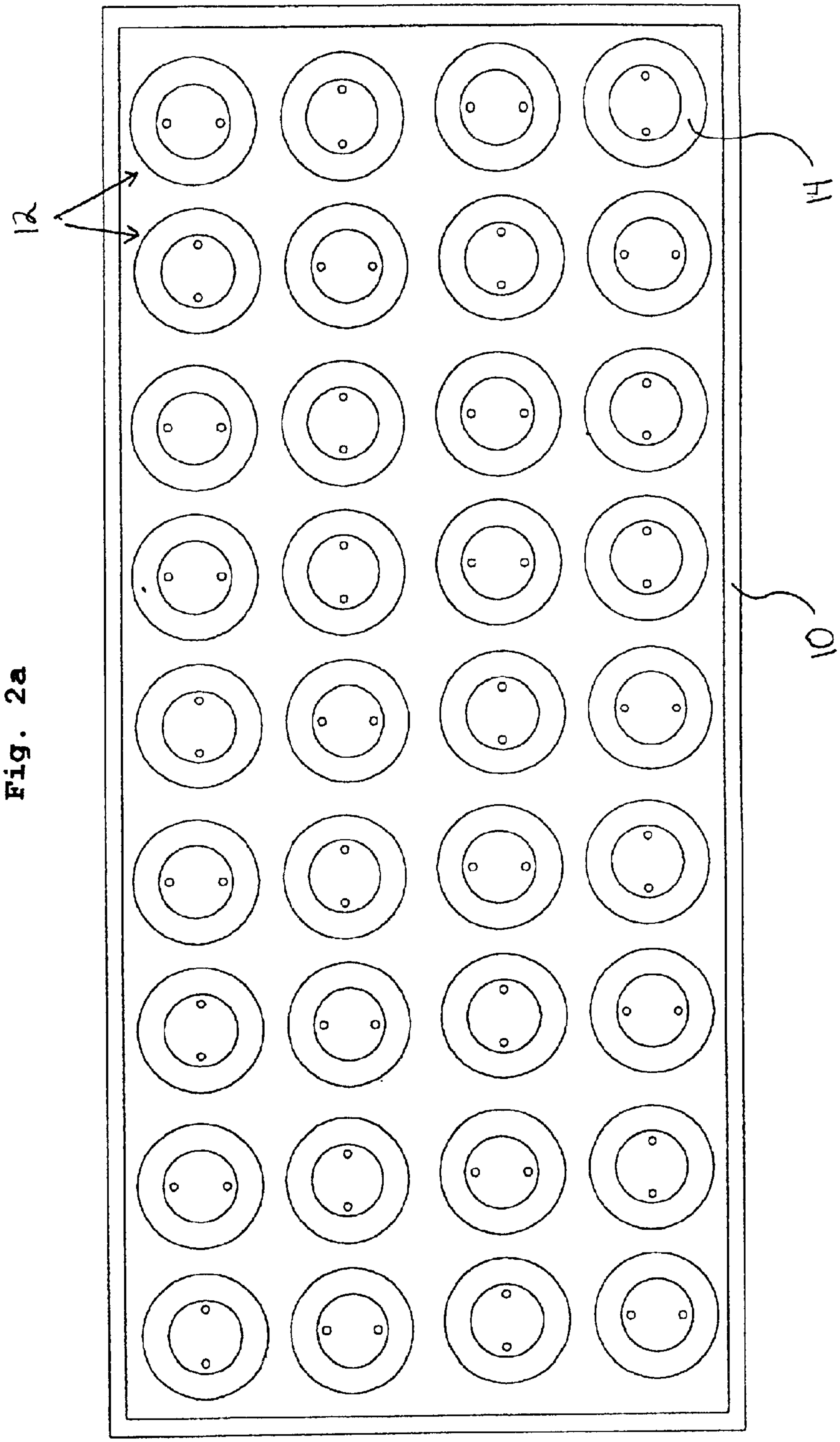
FIG. 2*a* is an overhead perspective view of a carton of bulk packaged articles as shown in FIG. 1.

As shown in FIGS. 1 and 2, a package 10 of bulk articles 12 can be difficult to use if the articles are not marked to differentiate the different types of articles that exist within the package. For example, elongated flourescent light bulbs typically have no markings on their end surfaces 14, as shown in FIGS. 2 and 2*a*. Since the end surfaces 14 are exactly the same, there is no way to differentiate, for example, the used bulbs from the new bulbs, or to differentiate between different types of bulbs within the same package. The user must at least partially remove the article from the packaging or storage carton in order to identify what the status of the article is.

In some cases markings, such as dates, lot numbers, serial numbers and the like, may be visible on or near the ends of the product, but when packaged, the devices are not arranged to make use of the system for identification, classification, and inventory control herein disclosed.

Figure 3:
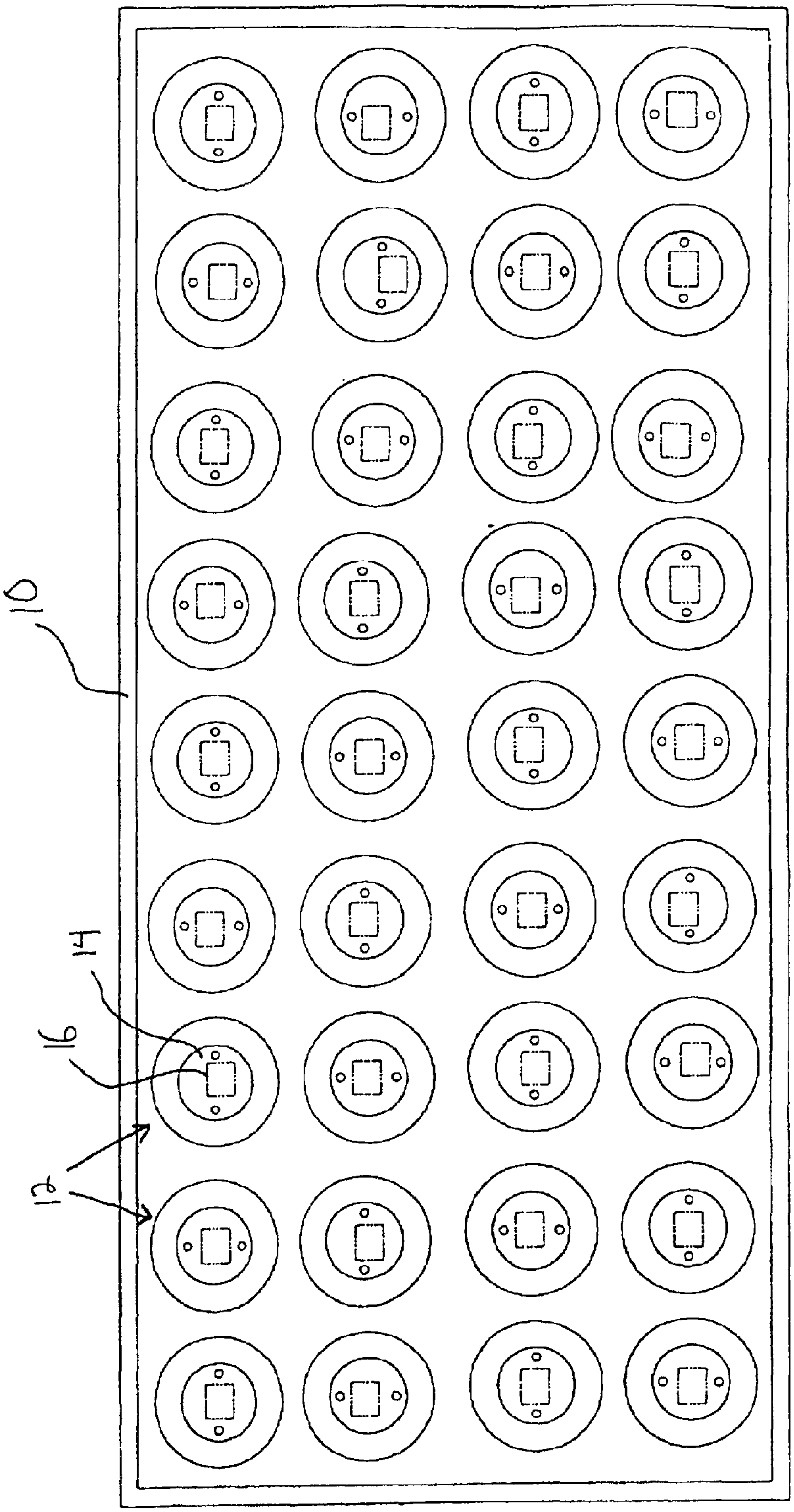
FIG. 3 is an overhead perspective view of a carton and bulk packaged articles having a first perception according to the present invention.

The articles, as shown in FIGS. 2*a* and 3, are examples of a system of marking that could be used with the present invention. FIGS. 5 and 6 and 8–21, show examples of individual articles 12 having a variety of different identifiable characteristics 16 that may be used within the scope of this invention.

The present invention provides a bulk storage system, articles, and method for identifying the different articles stored together or shipped within the same package without having to remove the articles from the package. The system, article, and method will make finding a particular article from a bulk supply of articles more time efficient, requires less handling, and requires less storage space because no additional cartons, packaging or containers are needed. Furthermore, by not having to remove the articles from the packaging to identify them or having to collect or store the articles in a separate container, the risk of damage to the articles is reduced, and the conservation of handling and space are achieved.

Figure 4:
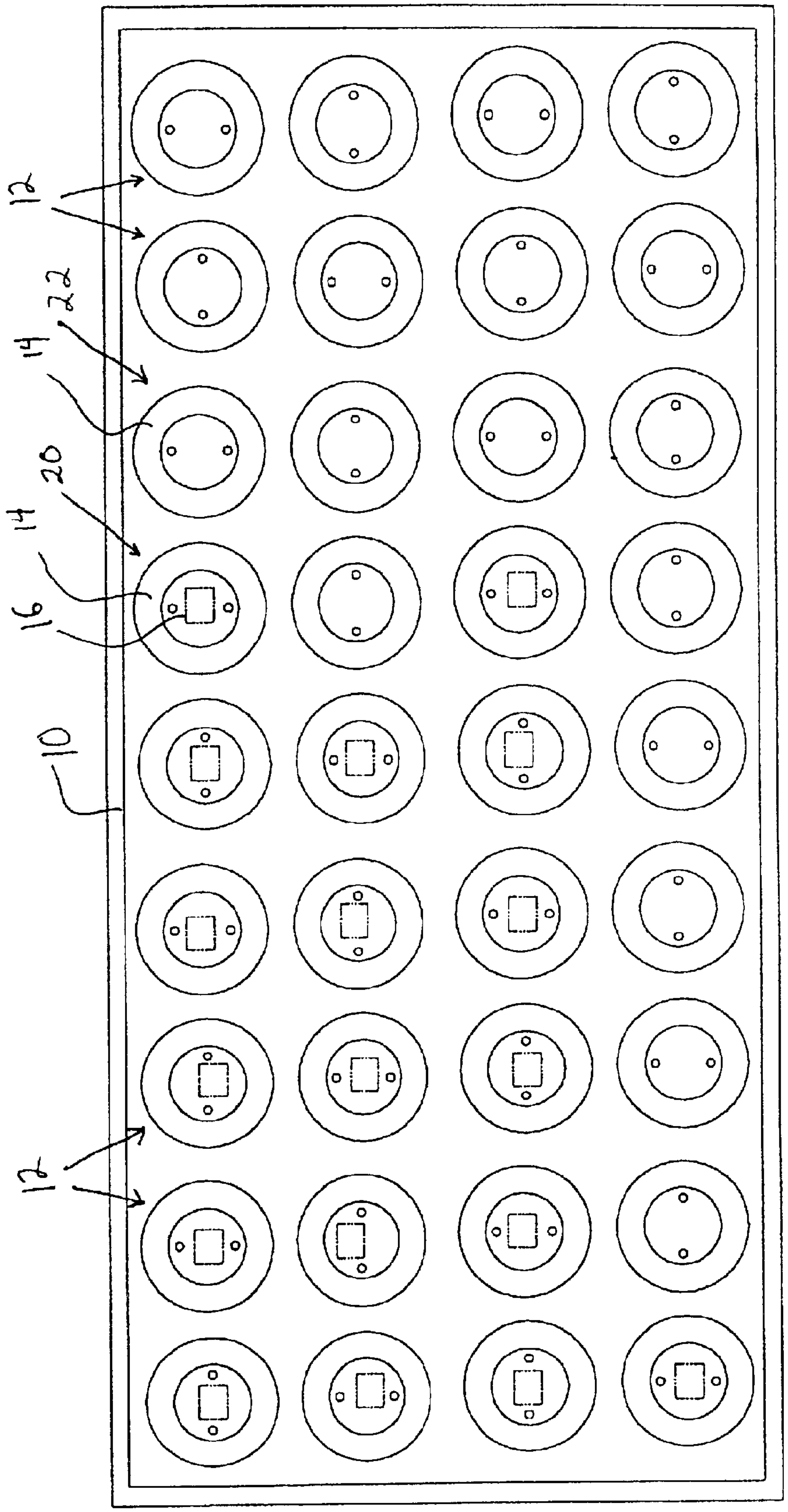
FIG. 4 is an overhead perspective view of the articles wherein some articles have been removed and replaced showing a second perception.
Figure 5:
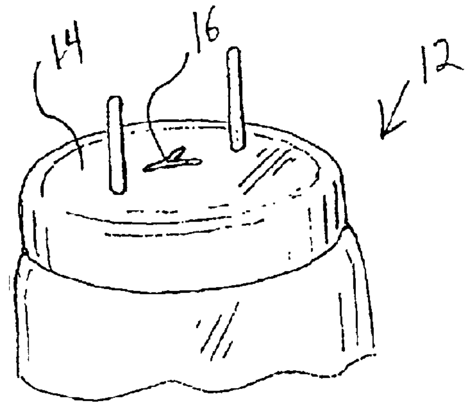
FIG. 5 is an elevated side perspective view of an alternative style of marking according to the present invention.
Figure 6:
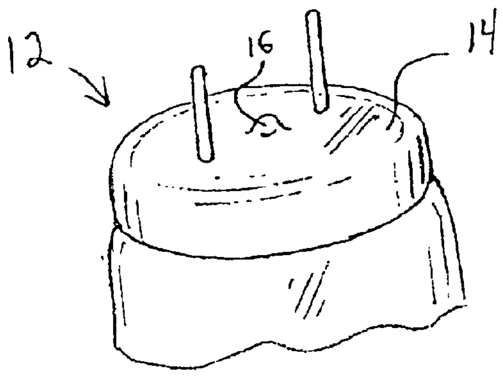
FIG. 6 is an elevated side perspective view of another alternative style of marking according to the present invention.

FIGS. 3 and 4 provide a pictorial example of how the method accomplishes its goal of providing identification, classification, and inventory tracking. As shown in FIG. 3, the articles 12 may be packaged with at least one surface 14, having an identifiable characteristic 16 thereon and having the surfaces 14 of the articles 12 bearing the characteristic 16, oriented either along or on one side of the packaging 10.

In the case where the characteristics 16 are already on the articles, when the packaging is opened from the side on which the characteristics have been aligned, the surfaces 14 having an identifiable characteristic 16 are visible. It is foreseeable that all of the surfaces of the article may have different identifiable characteristics, however, for the purposes of this invention, only one surface need be marked with a characteristic that is identifiable from those of the other surfaces. For example, an article may be packaged in a box. One side of the box may have red markings on it, while another side has a blue background color. These two indicators could be used to differentiate new from used, if the articles are oriented properly.

Figure 8:
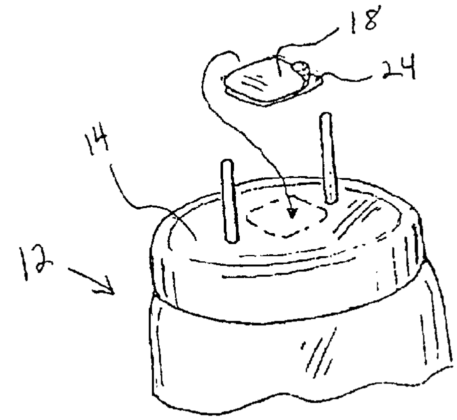
FIG. 8 is an elevated side perspective view of another alternative style of marking using a label being applied according to the present invention.
Figure 7:
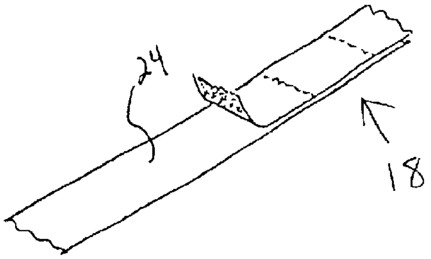
FIG. 7 is an elevated side perspective view of one means of marking the articles in accordance with the present invention.
Figure 10:
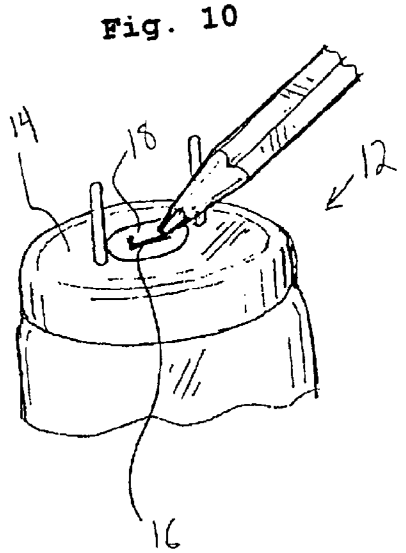
FIG. 10 is an elevated side perspective view of another alternative style of marking being applied according to the present invention.
Figure 9:
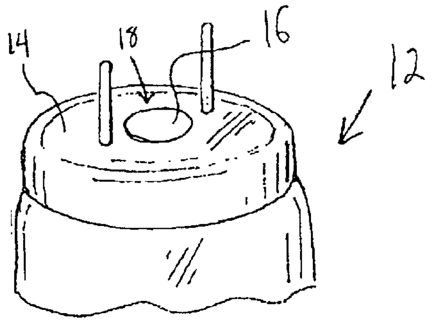
FIG. 9 is an elevated side perspective view of an article having a label applied according to the present invention.
Figure 11:
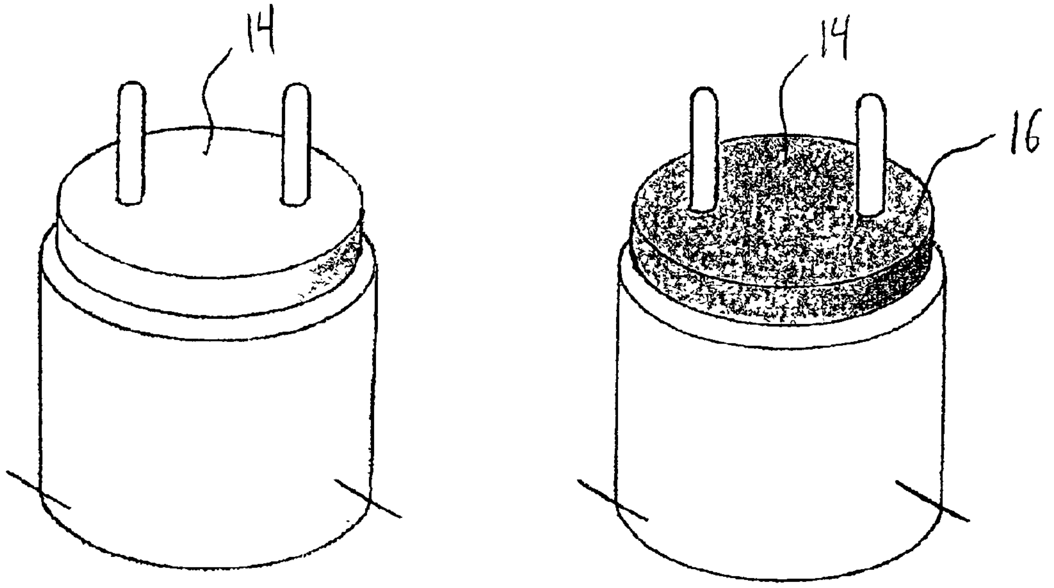
FIG. 11 is an elevated side perspective view of another alternative style of marking being applied according to the present invention wherein an end of the product is colored.

Alternatively, the articles 12 may be packaged in an unmarked condition and the marking may be applied at a later time. For example, as shown in FIGS. 1, 7, and 8, labels 18 on backing layer 24 have been included in the carton 10 for subsequent application to the articles 12 by the user.

In the case of the flourescent bulbs shown in FIGS. 3 and 4, the bulbs 12 have one end surface marked with a square 16 and one end surface unmarked. As shown in FIG. 3, the articles 12 are all oriented such that all of the end surfaces 14, marked with a square 16, are aligned together. This orientation provides the same first perception of each article.

In this case, if the user had opened the carton 10 at the other end, the user would have seen all of the surfaces 14 having unmarked ends. Therefore, with an article that is logically only visible at either one end or the other, the method could be implemented regardless of which end of the carton was opened. It is foreseeable that the outside surface of the packaging 10 could be marked to indicate which side of the package to open to expose the surfaces 14 of the articles bearing the desired identifiable symbol. Once the desired side of the packaging 10 is opened, the articles 12 are ready for use.

Typically, in the field of flourescent bulbs, when a new bulb 20 is removed, a used bulb 22 is inserted into the package in its place. Due to the possibility of breakage of some of the articles, it is foreseeable that the package will not remain completely full. When a used article 22 is placed into the package, it is oriented such that the second identifiable characteristic is visible. This second perception differentiates the used articles 22 from the new articles 20.

As shown in FIG. 4, the used bulbs 22, having a surface with no marking visible, are easily differentiable from the new bulbs 20 having a surface with a square symbol 16 visible. In this example, the square symbols 16 act as the first identifiable characteristic providing a first perception which indicates that the state of these bulbs is new and the lack of marking acts as the second identifiable characteristic providing a second perception that is different from the first which indicates that the state of these articles is not new. As can be ascertained by FIG. 4, by using the article of this invention and this method, a user can easily tell which articles should be removed for use.

The differentiation may be made by any means known or yet to be known in the art and may be applied at the factory or by the user. The different characteristic may be that one surface is marked and another is not marked. Incorporation of this system could be as simple as providing purchasers or users with instructions to accomplish the method themselves, for example, by marking one end of the products upon opening the bulk packaging or marking the used products upon their replacement by new products.

It is also foreseeable that the new articles could be differentiated from used articles using a variety of characteristics indicating a variety of different states. For example, new articles could have no marking, broken articles could have a star symbol, used but still operable articles could be represented by a "U" symbol. This system allows the user to store all articles together while still being able to easily differentiate between them.

The marking of the articles may be accomplished in many ways. The articles may have different visible surfaces having different characteristics so that when the articles, after they have been used, are reinserted into the packaging, the articles are oriented such that the different surface is visible, and it thereby distinguishes the used article from the new article.

The article may also be configured with a first identifiable characteristic that changes into a second identifiable characteristic over time or is actuated when it is used for its intended purpose. For example, in the field of flourescent bulbs, one or both ends of the bulb may be designed with a material that changes color and/or appearance when electricity, heat, light, and/or radiation act upon it or through the mechanics involved in installation or use of the product. The old bulb is then able to be differentiated from the new bulbs by the changed color and/or appearance of its end surface or surfaces. In this way, the first perception changes into the second perception when the state of the article changes.

Figure 13:
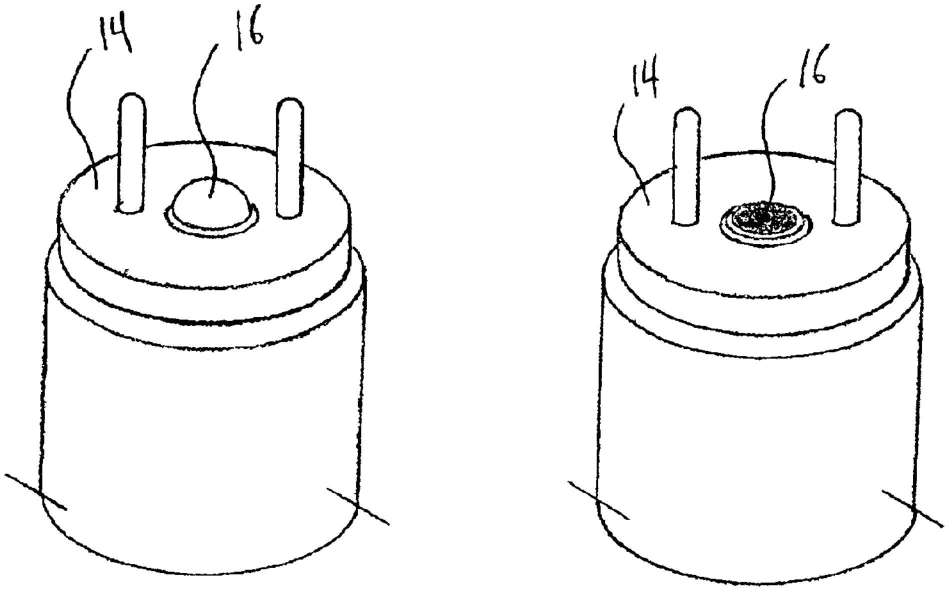
FIG. 13 is an elevated side perspective view of another alternative style of marking being applied according to the present invention wherein the mark comprises a button that may be depressed.

The article may also have an indicator device attached to it or in it that changes over time or when it is actuated through use of the article. For example, a switch, button, portal, meter, or other device may be installed on, in, through, or under the visible surface or a portion of the product itself could be made such that, when activated, it will provide a visible indicator of the article's condition. An example, as shown in FIG. 13, is a button that, when pressed, is deformed allowing it to be differentiated from unpressed buttons.

The marking may also be of a character that it may be able to provide a measured state or condition of the product, relative to its expressed or expected useful life. This type of marking could be utilized to provide the measured state of the product during use of the product. This allows for the user to time the replacement of the products with new products, merely by checking the measured markings. Markings of this nature could be provided by any suitable material, for example chemicals, compounds, and films may be utilized. One example, of a measurable marking material would be one that fades or changes color or texture over time.

Some other examples of marking systems may be: using a symbol such as a letter, number, word, trademark, generic symbol or random markings, or a combination thereof. For example, using the letter "N" on one surface for new and "U" on another surface for used. Other examples include the use of symbols that are commonly applied to products, but when oriented properly, allow a user to apply the system of the present invention. For example, the use of manufacturing dates, serial numbers, lot numbers, and the like. It may be the case that the articles have one of the above on one end and nothing on the other, or alternatively, a second characteristic on the other end. For example, the serial number on one end, and the lot number on the other end.

Figure 12:
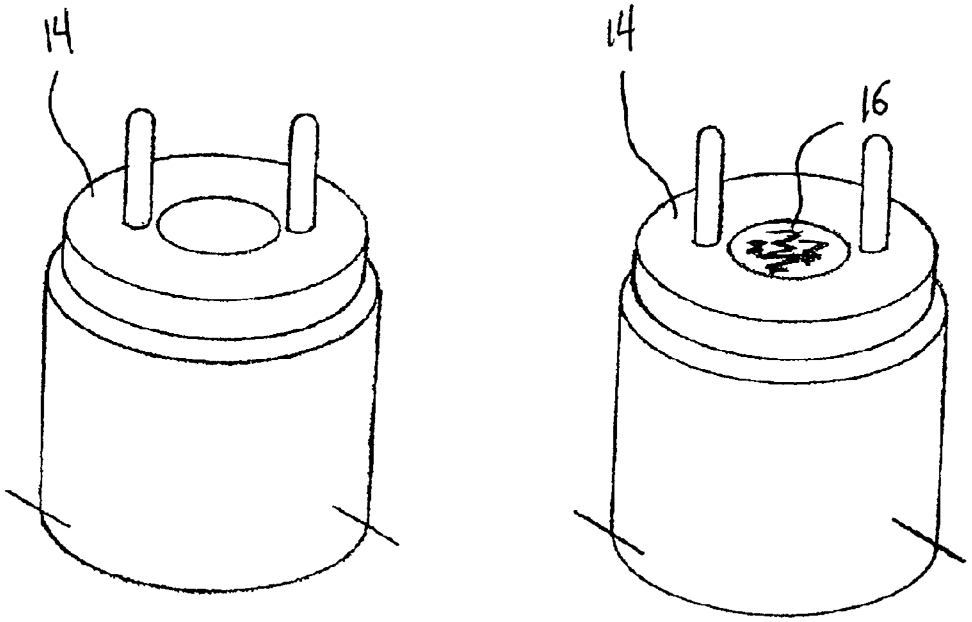
FIG. 12 is an elevated side perspective view of another alternative style of marking being applied according to the present invention wherein an end of the product has a surface wherein a mark may be created.

Another alternative identification system, may be provided by using color or shape. A color may be used to differentiate the state of the article by coloring a portion or the entire surface. For example, using green on one surface for new and red on another surface for used. This embodiment is show in FIG. 11, wherein one end is colored and the other end is not. This system may be accomplished by simply having a color on a portion or all of one surface. Additionally, as shown in FIG. 12, a scratch off coating or film may be applied to the surface, wherein a color is revealed when the surface is scratched.

The overall shape of the surface may be the identifiable feature. This may be achieved by altering the topography of the surface, including for example, the use of divots or bumps, or the shape of the perimeter of the surface may be different. For example, one surface may have a circular perimeter, while another surface has a hexagonal surface.

Additionally, it is foreseeable that different types of articles, having different marking schemes, could be included in a single package or may be stored together. In this case, the different types of new articles could be differentiated from each other by different first identifiable characteristics, and could be differentiated from articles having other states by either one or more second identifiable characteristics.

Figure 14:
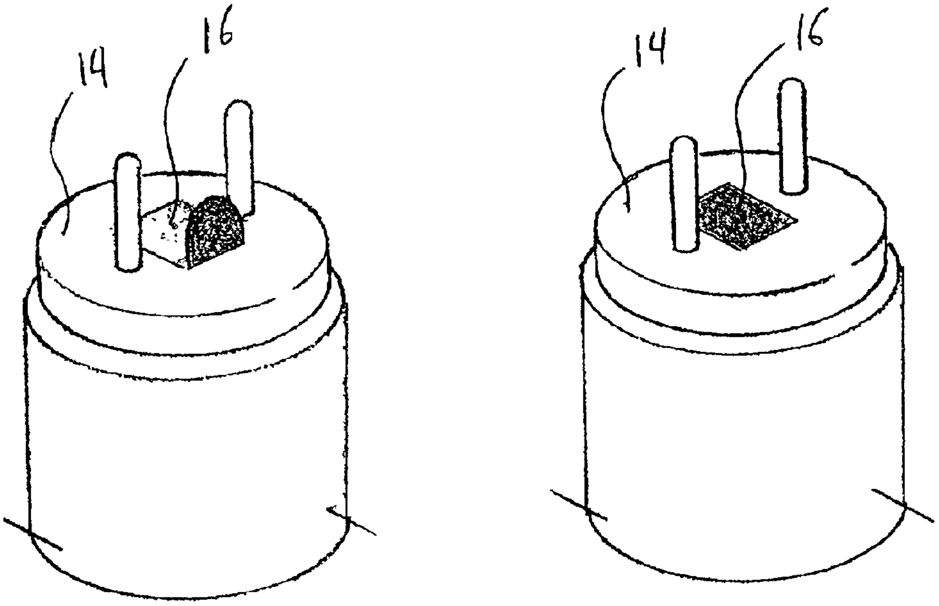
FIG. 14 is an elevated side perspective view of another alternative style of marking being applied according to the present invention wherein a multi-layer tab wherein the first layer may be removed to uncover a second layer.
Figure 15:
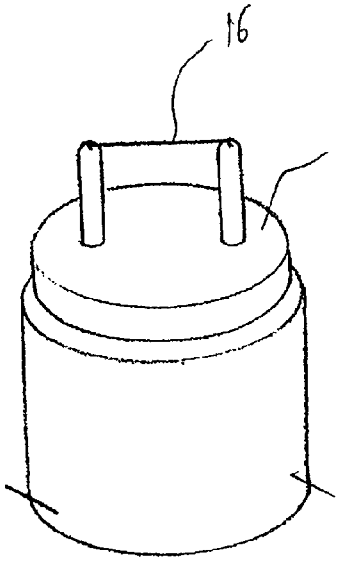
FIG. 15 is an elevated side perspective view of another alternative style of marking being applied according to the present invention wherein a wire is attached to the product.
Figure 16:
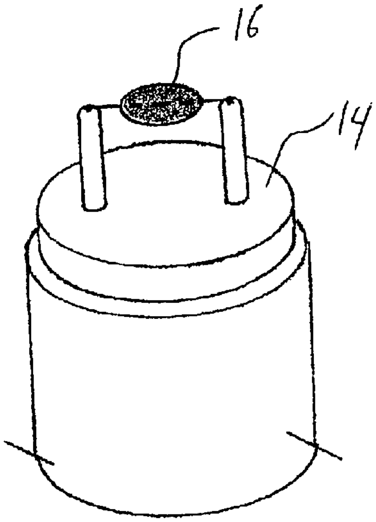
FIG. 16 is an elevated side perspective view of another alternative style of marking being applied according to the present invention wherein a wire and a flag are attached to the product.
Figure 17:
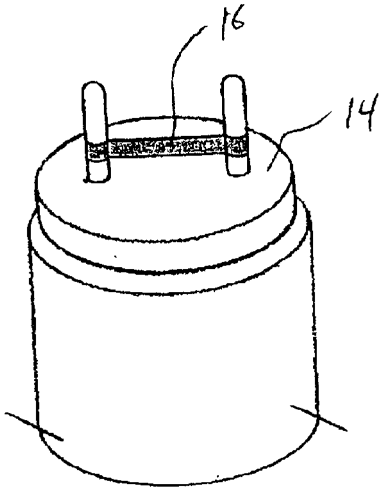
FIG. 17 is an elevated side perspective view of another alternative style of marking being applied according to the present invention wherein a flag is attached to the product.
Figure 18:
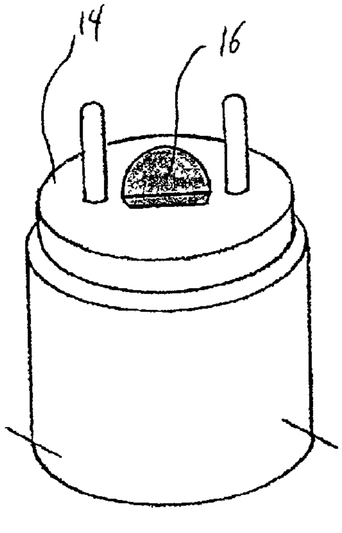
FIG. 18 is an elevated side perspective view of another alternative style of marking being applied according to the present invention wherein a removable or breakable tab is attached to the product.

Furthermore, the articles may have removable materials applied thereto that operate as markings to differentiate the products. For example, a flag or cap may be applied. The flag or cap may be colored and/or may have marking thereon to provide differentiation. For example, with respect to fluorescent bulbs, the flag may be a plastic, foil, or paper material or simply a filament such as a wire, line, or thread between the power contact pins on one or both ends. The flag may be removed prior to use or simply broken during installation or use. Some embodiments having flags are shown in FIGS. 14–18. In some embodiments, the removal of the flags may reveal a different marking, such as a color, underneath the flag. For example as shown in FIG. 14, a two ply flag may be applied to the surface of a product and when the top ply is removed, the second ply is revealed. Flags may be attached by any means, such as by wire or line, by adhesive, or by friction.

Figure 19:
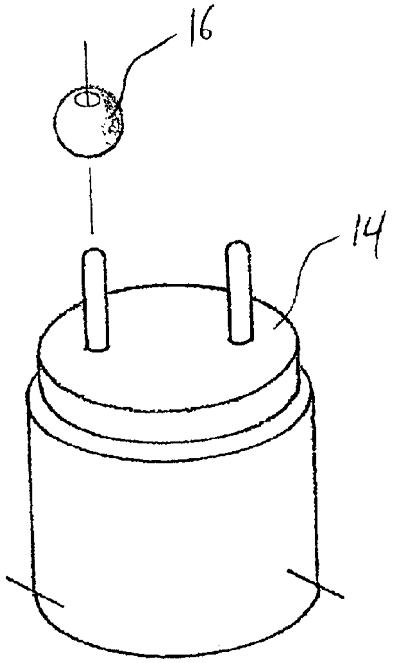
FIG. 19 is an elevated side perspective view of another alternative style of marking being applied according to the present invention wherein a cap is applied to the product.
Figure 20:
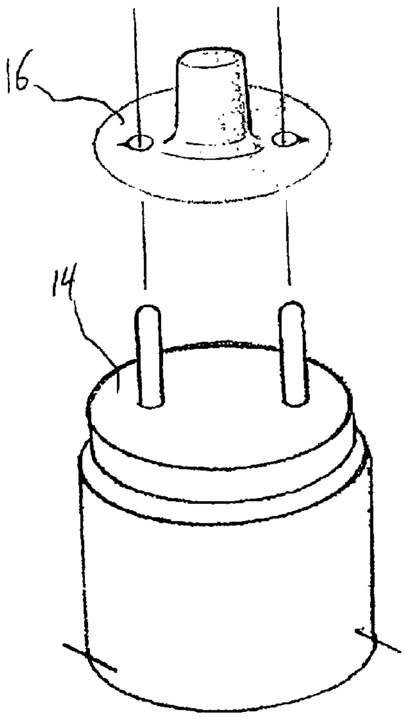
FIG. 20 is an elevated side perspective view of another alternative style of marking being applied according to the present invention wherein a cap is applied to the product.
Figure 21:
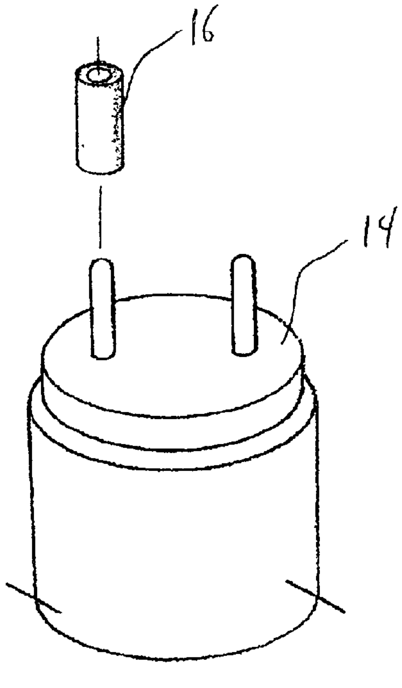
FIG. 21 is an elevated side perspective view of another alternative style of marking being applied according to the present invention wherein a cap is applied to the product.

Caps may be comprised of any material and may be adhered to the product by any means, such as adhesives, friction, and the like. For example, in one embodiment of a cap for a fluorescent bulb, the cap has one or more apertures sized to fit over the power contact pins of the bulb and is adhered to one or both pins by a frictional adhesion between the surface of the cap and the pin or pins. Suitable materials include plastic, metal, paper, fiberboard, and the like. As shown in FIGS. 19–21, caps can take any suitable form.

Figure 22:
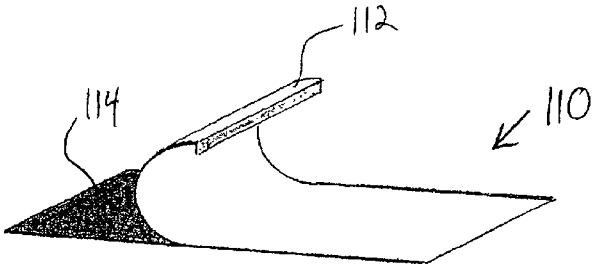
FIG. 22 is a perspective view of a multi-ply label for use in an embodiment of the present invention.
Figure 23:
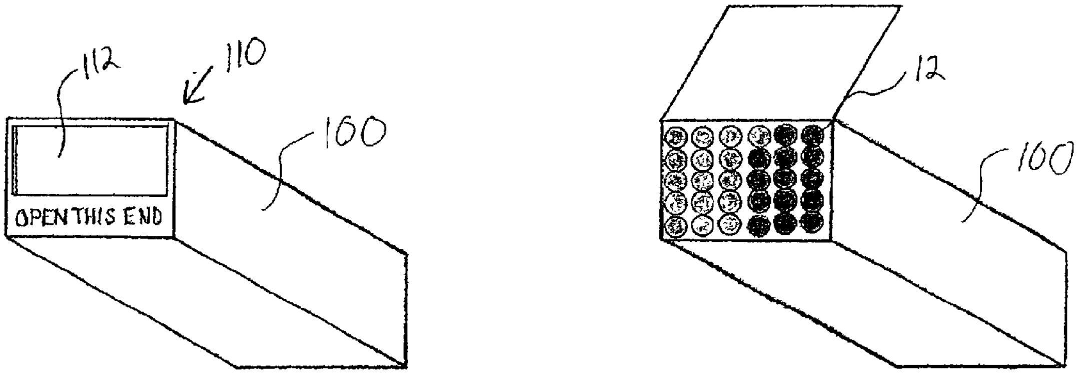
FIG. 23 is a top perspective view of a carton according to an embodiment of the present invention having a multi-ply label affixed to the carton and showing the carton open during use.
Figure 24:
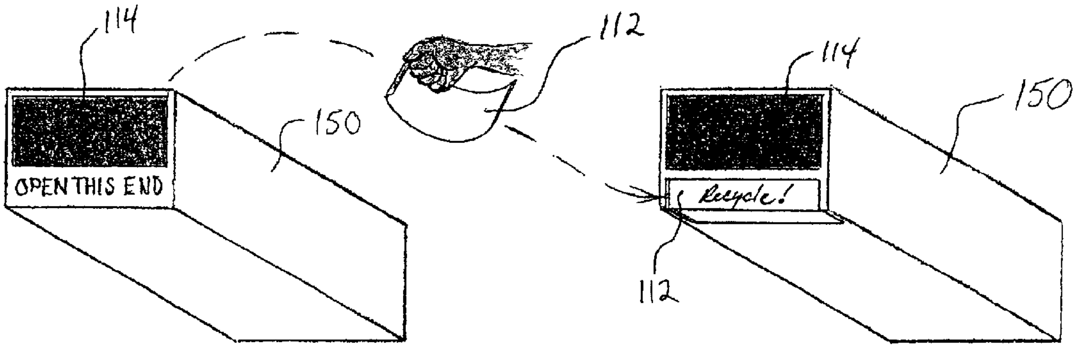
FIG. 24 is a top perspective view of the carton according of FIG. 23 showing the removal of the first ply of the label and affixation of the first ply to seal the carton.

Additionally, this system may be applied in a macro scale, to packages of bulk items, wherein the package has a first identifiable feature and a second identifiable feature, thereby allowing one type of products to be differentiated from another. For example, as shown in FIGS. 22–24, to differentiate a new carton 100 of flourescent bulbs from a used carton 150, a marking may be applied to the used or new carton to differentiate one from another. A specific embodiment of this general idea applies a two ply label 110. When the carton 100 is delivered to a user, the top ply 112 of the label is visible. When the carton is open, the label may or may not be visible, but when the carton is filled with used bulbs and is ready for disposal, the top ply of the label 112 may be removed to reveal the second ply of the label 114. Additionally, the top ply 112 may be used to seal the box if a suitable adhesive is utilized. Any distinguishable markings may be utilized on the cartons and/or labels, such as colors, letters, or symbols, for example.

Since many possible embodiments may be made of the present invention without departing from the scope thereof, it is to be understood that all matter herein set forth or shown in the accompanying drawings is to be interpreted in the illustrative and not a limiting sense.

That which is claimed is:

1. In an article having a cylindrical body having similar first and second ends, said article of a type to be packed with other like articles in side by side arrangement with only one of the ends of each article easily visible, and said article having a first state and a second state, an improved configuration of at least one end of each article for easy identification, classification, and inventory tracking, the improved configuration comprising at least one end of said article having a first perception and a second perception, said first perception indicating said first state of said article and said second perception indicating said second state of said article.

2. An article according to claim 1, wherein said first state is as an unused article and said second state is as a used article.

3. An article according to claim 1, wherein said article has a surface at each end and wherein said first perception is provided by a first identifiable characteristic located on one of said surfaces and said second perception is provided by a second identifiable characteristic located on the other one of said surfaces.

4. An article according to claim 3, wherein said first identifiable characteristic is a first color and said second identifiable characteristic is a second color.

5. An article according to claim 1, comprising at least two of said articles contained together in a side by side arrangement in a package and wherein said articles are oriented such that said first identifiable characteristic of each article in the package is adjacent to the first identifiable characteristic of each of the other articles.

6. An invention according to claim 5, wherein the package enclosing said articles has an exterior surface and wherein a portion of the exterior surface adjacent the alignment of each said first identifiable characteristic contains a marking.

7. An article according to claim 1, wherein said article has a material thereon comprised of two overlapping surfaces, wherein said first surface represents said first state and said second layer represents said second state, said article having means for revealing said second state.

8. An article according to claim 7, wherein said revealing means comprises a first surface having a scratch off coating.

9. An article according to claim 7, wherein said revealing means comprises first and second surfaces releasably adhered together.

10. An article according to claim 1, wherein said first perception is provided by a first identifiable characteristic and said second perception is provided by a second identifiable characteristic.

11. An article according to claim 10, wherein said first identifiable characteristic is a first color and said second identifiable characteristic is a second color.

12. An article according to claim 10, wherein first and second characteristics are provided by a material capable of changing color.

13. An article according to claim 12, wherein said material fades from a first color to a second color over a predetermined period of time.

14. An article according to claim 10, wherein said first and second characteristics are provided by a material capable of changing texture.

15. An article according to claim 14, wherein said material is constructed and arranged to change color in response to an emanation provided by the use of the article.

16. An article according to claim 10, wherein said first identifiable characteristic is provided by a flag.

17. An article according to claim 16, wherein said flag is comprised of a filament.

18. An article according to claim 16, wherein said flag is comprised of a plastic material.

19. An article according to claim 16, wherein said flag is comprised of a paper material.

20. An article according to claim 16, wherein said flag is comprised of a metallic material.

21. An article according to claim 10, wherein said first identifiable characteristic is provided by a cap.

22. An article according to claim 21, wherein said cap is comprised of a plastic material.

23. An article according to claim 21, wherein said cap is comprised of a paper material.

24. An article according to claim 21, wherein said cap is comprised of a fiberboard material.

25. An article according to claim 10, wherein said first identifiable characteristic is provided by a depressable button.

26. An article according to claim 1, wherein the amount of said change is measured by the amount of use of said article and therefore the amount of emanation provided.

27. An article having a cylindrical shape and having first and second ends, said article having a first state and a second state, and at least one end of the article having a first perception and a second perception, said first perception indicating said first state and said second perception indicating said second state, wherein said article further comprises a means for changing said first perception into said second perception when said article is placed into use.

28. An article according to claim 27, wherein said means for changing said first perception is comprised of a chemical composition of at least a portion of the material comprising said article, said chemical composition altering appearance during use of the article.

29. A method for identifying, classifying, and inventory tracking bulk packaged goods having at least a first state and a second state, comprising the steps of:

providing at least one package of bulk goods wherein at least one package contains goods of a first state and at least one package contains goods of a second state;

providing said bulk packages of goods with a first perception indicating said first state and a second perception indicating said second state;

providing a multi-ply label on said bulk packaging, wherein a first layer represents said first identifiable characteristic and a second label represents a second identifiable characteristic; and removing said first layer from said multi-ply label; and applying said first layer to said bulk package to seal said package.

30. The method of claim 29, wherein one of the steps of removing the label and applying the label provides a visual perception of the state of the goods with the package.

* * * * *